Aug. 16, 1960     A. K. SEIRIG ET AL     2,948,997
ADJUSTING DEVICE FOR GRINDING DISCS
Filed Feb. 4, 1959

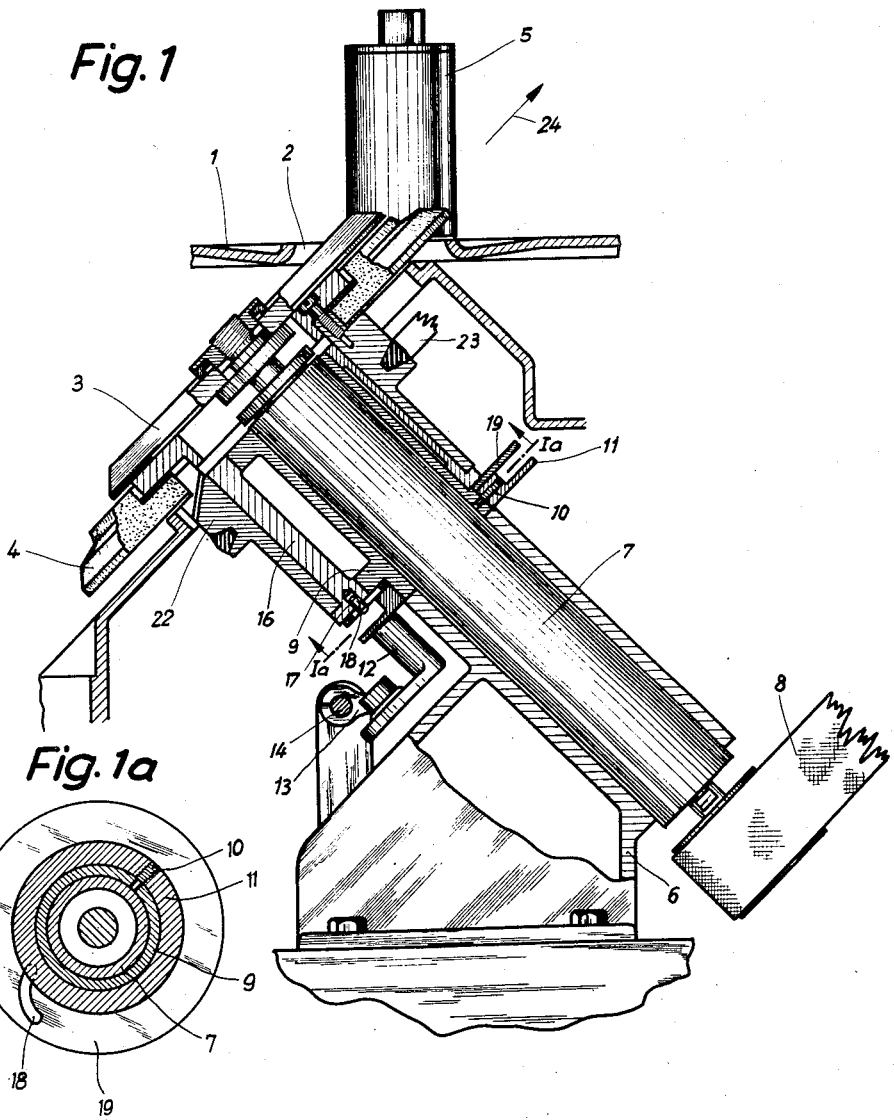

United States Patent Office 2,948,997
Patented Aug. 16, 1960

2,948,997

ADJUSTING DEVICE FOR GRINDING DISCS

Alfred K. Seirig, Dusseldorf, Adolf Enders, Lubeck, and Hans Joachim Strunck, Koln, Germany, assignors to Wernicke & Co. K.G., Dusseldorf-Eller, Germany Filed Feb. 4, 1959, Ser. No. 791,090

Claims priority, application Germany Feb. 6, 1958

5 Claims. (Cl. 51—165)

The present invention concerns an adjusting device for grinding discs, especially for use in connection with grinding devices for spectacle glasses. Particularly ceramic discs of such grinding devices are subjected to a considerable wear at the surface machining the spectacle rim so that a post adjustment of the grinding disc in the direction toward the support for the spectacle glass is required. When employing two parallel grinding discs of different hardness, due to the different wear of both discs, a post adjustment of one grinding disc relative to the other grinding disc is likewise necessary.

It is, therefore, an object of the present invention to provide an improved adjusting device which will considerably simplify the adjusting operation.

It is another object of this invention to provide an adjusting device for grinding discs of grinding devices for spectacle glasses, which will be highly sensitive, and, therefore, will allow a fine and precise adjustment of the grinding discs.

These and other objects and advantages of the invention will appear more clearly from the following specification in connection with the accompanying drawings, in which:

Fig. 1 illustrates a section through an adjusting device according to the invention for use in connection with two parallel grinding discs.

Fig. 1a is a sectional view along the line Ia—Ia of Fig. 1.

General arrangement

The adjustable device according to the present invention is characterized primarily in that the driving part of one of the discs is adjustable by means of two spindle nuts movable toward and away from each other, said adjustment being effected by angular levers and rotatable interengaged eccentrics. The driving part may be formed, for instance by a bushing or sleeve. The spindle nuts are movable perpendicularly to the axis of the grinding disc on a spindle provided with two oppositely directed threaded sections so that, when the spindle nuts move toward each other or away from each other, also the eccentrics will be rotated in opposite directions with regard to each other. Due to the simultaneous movement of the eccentrics in opposite direction of rotation with regard to each other, a straight-line adjusting movement of the grinding disc will be obtained.

According to a practical embodiment of the invention, the slightly arched angular levers are connected to flat rings connected to the eccentrics while one flat ring is connected to its eccentric by a stud or the like engaging a longitudinally extending opening, whereas the second flat ring is rotatably connected to its eccentric.

According to a further embodiment, two grinding discs may be mounted parallel to each other, and the driving part in the form of a shaft of one disc may extend through the eccentric and the flat rings of the adjusting device and the driving part of the other disc.

Structural arrangement

Figure 2:
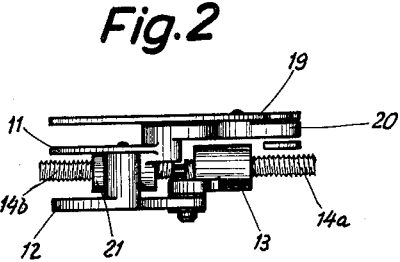
Fig. 2 is a portion of a top view of the threaded spindle with nuts and of the angular levers with flat rings.
Figure 3:
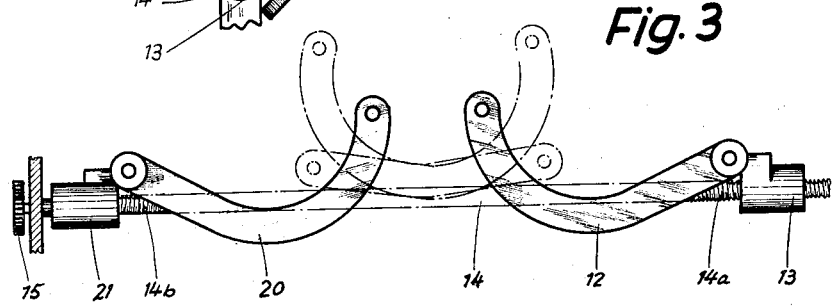
Fig. 3 is a side view of Fig. 2 with the flat rings and nuts adjustable toward the outside omitted.

Referring now to the drawing in detail, the upper cover plate 1 pertaining to the grinding apparatus is only partly shown. The cover plate 1 has an opening 2 through which extend the grinding discs 3 and 4. Mounted on the grinding device is a rotatable supporting shaft 5 for supporting the spectacle glass support (not shown in the drawings). The apparatus furthermore comprises a bracket 6 supporting the shaft 7 of the grinding disc 3 and adapted to be driven by a belt 8. Mounted on shaft 7 is a first eccentric bushing 9 which is connected to a flat ring 11 by means of a screw 10. Tiltably linked to said flat ring 11 is an angular lever 12 tiltably connected to a threaded nut 13 as shown in Fig. 2. Nut 13 is, due to the threaded spindle 14, arranged perpendicular to shaft 7 and thereby to the eccentric bushing 9 and is movable by means of a knurled head 15 from the outside of the apparatus, said knurled head being connected to shaft 14.

Said first eccentric bushing 9 is surrounded by a second eccentric bushing 16 provided with a pin 17 engaging a slot 18 of a second flat disc 19 which latter is connected to one end of an angular lever 20 adapted to tilt on flat disc 19. The other end of lever 20 is tiltably connected to a threaded nut 21 mounted on and threadably engaged by the threaded spindle 14. Spindle 14 is provided with two oppositely directed threaded sections 14a and 14b so that rotation of spindle 14 will cause nuts 13 and 21 to move toward or away from each other whereby the angular levers 12, 20 will turn their flat discs 11, 19 and consequently the eccentric bushings 9, 16 relative to each other.

Figure 4:
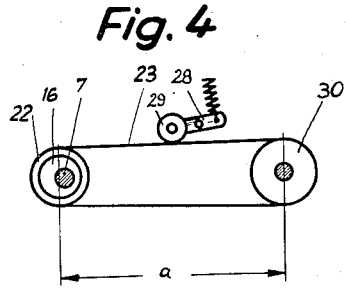
Figs. 4 and 5 show means for straightening the driving-belt of the adjustable disc.
Figure 5:
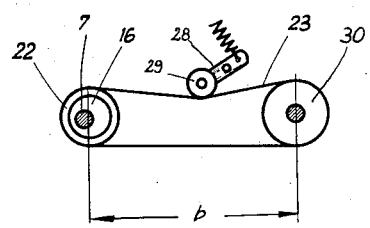

Mounted on the outer or second eccentric bushing 16 is the driving part for disc 4 said driving part being designed as a bushing 22 adapted to be rotated by a V-belt 23, which is straightened by a spring-loaded lever 28 with a pulley 29, when the distance of the bushing from the driving roller 30 is reduced from $a$ to $b$, Figs. 4 and 5.

As will be evident from the above, while disc 3, which preferably is designed as a diamond disc, maintains its position, disc 4, which may for instance be a ceramic disc, will be linearly adjusted in the direction of the arrow 24.

Figure 1B:
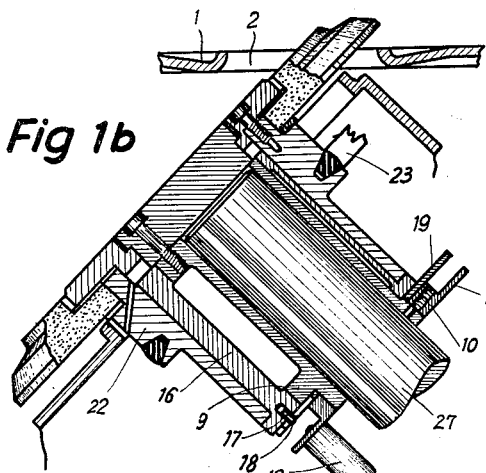
Fig. 1b is a section similar to that of Fig. 1 but differing therefrom in that one grinding disc only is employed.

If the invention is employed with a grinding device having one grinding disc only, shaft 7 will be superfluous and will in this instance be replaced by a stud 27 or the like extending into the eccentric bushing 9 as shown best in Fig. 1b.

It is, of course, to be understood that the present invention is, by no means, limited to the particular construction shown in the drawings but also comprises any modifications within the scope of the appended claims.

What we claim is:

1. In an adjusting mechanism for two grinding discs, especially for use in connection with grinding devices for spectacle glasses: a first grinding disc, first power conveying means drivingly connected to said first disc and including a supporting member firmly connected to said first disc for rotation therewith, said first power conveying means being operable to rotate said first disc, two eccentric members adjustably arranged one within the other, one of said eccentric members freely rotatably supporting said supporting member, a second grinding disc, second power conveying means drivingly connected to said second grinding disc and including a rotatable member rotatably mounted on the other one of said eccentric members, and link means respectively connected to said eccentric members and operable to adjust said eccentric members to thereby vary the positions of the first and second grinding discs relative to each other.

2. In an adjusting mechanism for grinding discs, especially for use in connection with grinding devices for spectacle glasses: a grinding disc, power conveying means drivingly connected to said disc and including a supporting member firmly connected to said disc for rotation therewith, said power conveying means being operable to rotate said disc, two eccentric members adjustably arranged one within the other, the outer one of said eccentric members freely rotatably supporting said supporting member, first and second link means, one end portion of said link means being respectively pivotally connected to said eccentric members, a rotatable spindle having two threaded sections with the thread of one section being oppositely directed to the thread of the other section, and two nuts respectively threadedly engaging said threaded sections and respectively pivotally connected to the other end portions of said first and second link means.

3. In an adjusting mechanism for grinding discs, especially for use in connection with grinding devices for spectacle glasses: a grinding disc, power conveying means drivingly connected to said disc and including a supporting member firmly connected to said disc for rotation therewith, said power conveying means being operable to rotate said disc, two eccentric members adjustably arranged one within the other, the outer one of said eccentric members freely rotatably supporting said supporting member, a first annular member operatively connected to one of said eccentric members for turning the same in response to a turning movement of said first annular member, a second annular member operatively connected to the other eccentric member for turning the latter in response to a turning movement of said second annular member, first link means having one end portion pivotally connected to said first annular member, second link means having one end portion pivotally connected to said second annular member, a rotatable spindle having two threaded sections with the thread of one section being oppositely directed to the thread of the other section, and two nuts respectively threadedly engaging said threaded sections and respectively pivotally connected to the other end portions of said first and second link means.

4. In an adjusting mechanism for grinding discs, especially for use in connection with grinding devices for spectacle glasses: a grinding disc, power conveying means drivingly connected to said disc and including a supporting member firmly connected to said disc for rotation therewith, said power conveying means being operable to rotate said disc, two eccentric members adjustably arranged one within the other, the outer one of said eccentric members freely rotatably supporting said supporting member, a first annular member connected to one of said eccentric members, a second annular member provided with a longitudinal slot, a pin supported by the other one of said eccentric members and extending into said longitudinal slot, first link means having one end portion pivotally connected to said first annular member, second link means having one end portion pivotally connected to said second annular member, a rotatable spindle having two threaded sections with the thread of one section being oppositely directed to the thread of the other section, and two nuts respectively threadedly engaging said threaded sections and respectively pivotally connected to the other end portions of said first and second link means.

5. In an adjusting mechanism for grinding discs, especially for use in connection with grinding devices for spectacle glasses: a rotatable shaft, a first driving element connected to said shaft for rotating the same, a first grinding disc rotatably connected to said shaft, a second grinding disc in parallel arrangement to said first grinding disc and operable independently of the latter, a first eccentric bushing rotatably journalled on said shaft, a second eccentric bushing rotatably journalled on said first bushing, a supporting member rotatably journalled on said second bushing and firmly connected to said second disc for rotation therewith, said supporting member including a second driving element operable to rotate said supporting member and thereby said second disc, a first turnable annular member surrounding said shaft and operatively connected to said first eccentric bushing for turning the same in response to a turning movement of said first annular member, a second turnable annular member surrounding said shaft and operatively connected to said second eccentric bushing for turning the latter in response to a turning movement of said second annular member, and link means operable simultaneously and respectively pivotally connected to said first and second annular members for adjusting the same.

References Cited in the file of this patent
UNITED STATES PATENTS 1,373,193    Lumsden _____ Mar. 29, 1921